(12) United States Patent
Conrad et al.

(10) Patent No.: US 8,944,096 B2
(45) Date of Patent: Feb. 3, 2015

(54) METHOD AND DEVICE FOR CONTROLLING THE PRESSURE AND/OR FLOW RATE OF FLUID

(75) Inventors: Ruediger Conrad, Stockelsdorf (DE); Heiko Marz, Luebeck (DE)

(73) Assignee: B/E Aerospace Systems GmbH, Lübeck (DE)

( * ) Notice: Subject to any disclaimer, the term of this patent is extended or adjusted under 35 U.S.C. 154(b) by 509 days.

(21) Appl. No.: 13/057,225

(22) PCT Filed: Jul. 30, 2009

(86) PCT No.: PCT/EP2009/005528
§ 371 (c)(1),
(2), (4) Date: Feb. 2, 2011

(87) PCT Pub. No.: WO2010/015360
PCT Pub. Date: Feb. 11, 2010

(65) Prior Publication Data
US 2011/0132467 A1    Jun. 9, 2011

(30) Foreign Application Priority Data

Aug. 2, 2008  (DE) .......................... 10 2008 036 215

(51) Int. Cl.
*F16K 31/02* (2006.01)
*G05D 7/06* (2006.01)
*G05D 16/20* (2006.01)

(52) U.S. Cl.
CPC .......... G05D 7/0635 (2013.01); G05D 16/2013 (2013.01)
USPC ......... 137/487.5; 310/10; 310/11; 310/12.25; 128/204.18

(58) Field of Classification Search
USPC ............... 137/487.5; 128/204.18; 310/10–11, 310/12.25
See application file for complete search history.

(56) References Cited

U.S. PATENT DOCUMENTS 2,701,526 A * 2/1955 Rotkin .......................... 102/208
3,289,403 A * 12/1966 Oprecht ..................... 60/39.281
(Continued)

FOREIGN PATENT DOCUMENTS

| DE | 19728319 A1 | 1/1999 |
| EP | 1674666 A1 | 6/2006 |
| WO | 2008022766 A1 | 2/2008 |

OTHER PUBLICATIONS

Office Action issued on May 14, 2009 in German Application No. 10 2008 036 215.8-52.
(Continued)

*Primary Examiner* — John Rivell
*Assistant Examiner* — Minh Le
(74) *Attorney, Agent, or Firm* — Panitch Schwarze Belisario & Nadel LLP

(57) ABSTRACT

A method for controlling the pressure and/or the flow rate of a fluid includes withdrawing flow energy from a fluid flowing through a pipeline (15). This energy is converted at least partially into electrical energy and used for the electrical control (65) of the flow rate and/or the pressure of a fluid. The device for controlling the flow rate and/or pressure of a fluid in a pipeline (20) has at least one electric generator (35), which is developed for the withdrawal of flow energy from a flowing fluid and for converting this energy at least partially into electrical energy. The device has a control mechanism (65) for controlling the flow rate and/or pressure of a fluid in a pipeline (20) with an electric driving mechanism supplied by the generator (35).

9 Claims, 1 Drawing Sheet

(56) References Cited

U.S. PATENT DOCUMENTS

| | | | |
|---|---|---|---|
| 3,428,836 A * | 2/1969 | Klein | 310/11 |
| 3,432,694 A * | 3/1969 | Bidard | 310/11 |
| 3,496,871 A * | 2/1970 | Stengel | 417/410.1 |
| 3,555,312 A * | 1/1971 | Bidard | 310/11 |
| 3,776,279 A * | 12/1973 | O'Connor, Jr. | 137/802 |
| 4,122,381 A * | 10/1978 | Sturm | 320/128 |
| 4,242,591 A * | 12/1980 | Harville | 290/1 R |
| 4,838,310 A * | 6/1989 | Scott et al. | 137/624.14 |
| 4,951,915 A * | 8/1990 | Piao | 251/14 |
| 5,251,815 A | 10/1993 | Foye | |
| 5,321,327 A * | 6/1994 | Jensen | 310/11 |
| 5,427,350 A * | 6/1995 | Rinkewich | 251/30.01 |
| 5,969,429 A * | 10/1999 | Rudolph et al. | 290/54 |
| 6,225,705 B1 * | 5/2001 | Nakamats | 290/43 |
| 6,734,574 B2 * | 5/2004 | Shin | 290/1 R |
| 6,744,154 B2 * | 6/2004 | Leitner-Wise et al. | 310/12.25 |
| 6,798,080 B1 * | 9/2004 | Baarman et al. | 290/43 |
| 6,981,839 B2 * | 1/2006 | Fan | 415/4.1 |
| 6,982,501 B1 * | 1/2006 | Kotha et al. | 310/11 |
| 7,009,310 B2 * | 3/2006 | Cheung et al. | 290/1 R |
| 7,755,008 B2 * | 7/2010 | Tsai | 219/628 |
| 7,945,973 B2 * | 5/2011 | Khorshid | 4/623 |
| 2002/0014239 A1 | 2/2002 | Chalvignac | |
| 2007/0283959 A1 * | 12/2007 | Rassloff | 128/204.18 |
| 2007/0283960 A1 * | 12/2007 | Meckes et al. | 128/204.21 |
| 2008/0087341 A1 * | 4/2008 | Burlage et al. | 137/624.11 |
| 2008/0150472 A1 * | 6/2008 | Tsai | 320/101 |
| 2009/0314296 A1 * | 12/2009 | Cannon | 128/205.25 |
| 2010/0078019 A1 * | 4/2010 | Rittner et al. | 128/202.26 |
| 2011/0011400 A1 * | 1/2011 | Gentner et al. | 128/204.18 |
| 2011/0174307 A1 * | 7/2011 | Lessi et al. | 128/204.21 |
| 2013/0162057 A1 * | 6/2013 | Turner | 310/10 |

OTHER PUBLICATIONS

Int'l. Search Report issued on Jun. 4, 2010 as Int'l. Application No. PCT/EP2009/005528.

* cited by examiner

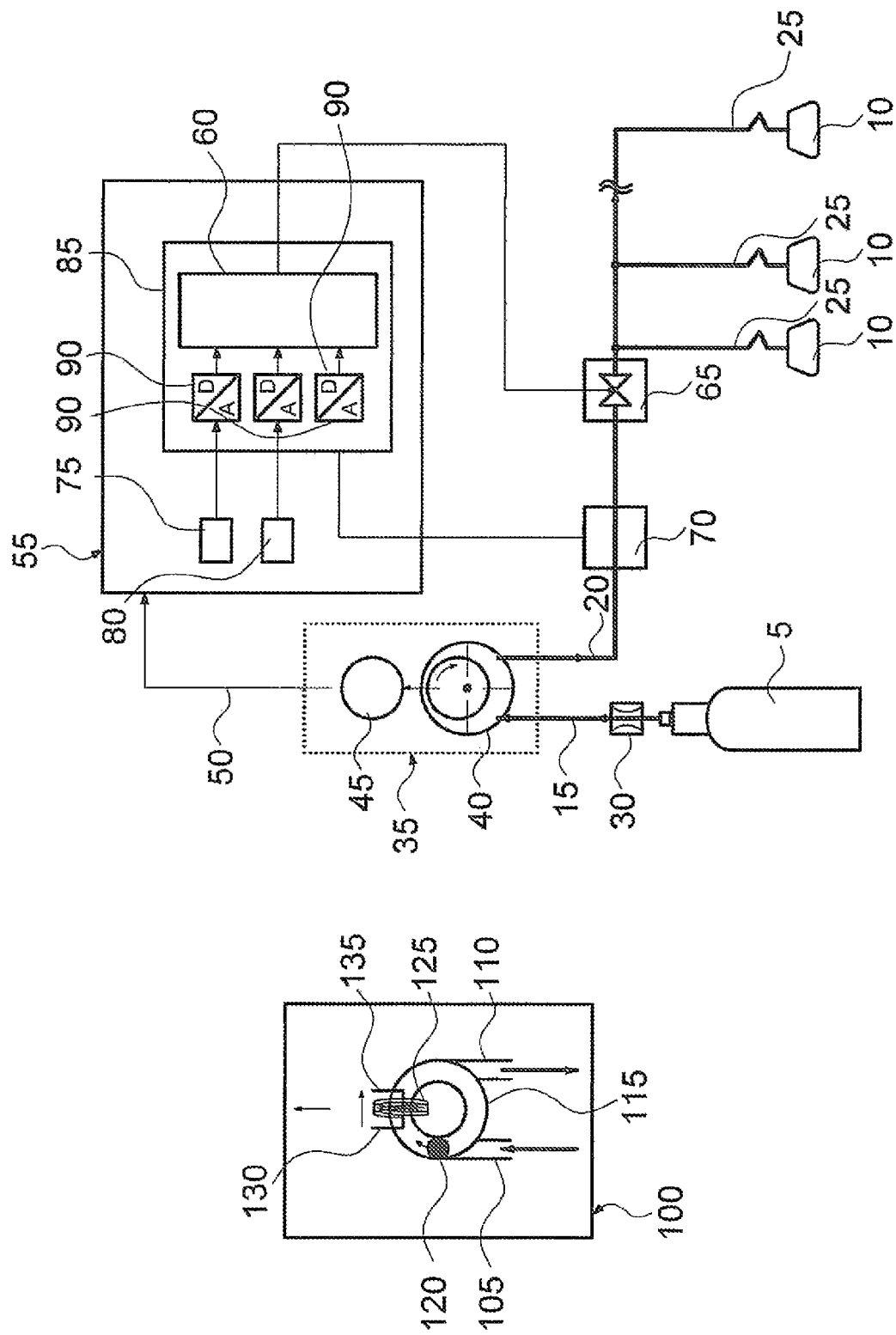

METHOD AND DEVICE FOR CONTROLLING THE PRESSURE AND/OR FLOW RATE OF FLUID

CROSS-REFERENCE TO RELATED APPLICATIONS

This application is a Section 371 of International Application No. PCT/EP2009/005528, filed Jul. 30, 2009, which was published in the German language on Feb. 11, 2010, under International Publication No. WO 2010/015360 A4 and the disclosure of which is incorporated herein by reference.

BACKGROUND OF THE INVENTION

Embodiments of the invention relate to a method for controlling the pressure and/or the flow rate of a fluid, and to a device for controlling the flow rate and/or pressure in a conduit.

It is particularly the case in aircraft, that the task regularly arises, of controlling the flow rate and/or the pressure of a fluid. For example, systems for emergency oxygen supply in aircraft require methods and devices for metering the oxygen.

Basically, there are a multitude of possibilities of controlling the flow rate and/or the pressure of a fluid. These basically fall into two categories: Either the energy necessary for the control is supplied in an electrical manner, as is effected for example in an electrically controllable proportional valve. Alternatively, the control functions in a purely mechanical manner, such as pneumatically or hydraulically, as in a pressure reducer.

These two alternatives thereby have the following disadvantages: Mechanical control units, as is known, operate in a less accurate manner. Moreover, they are typically quite heavy, which is disadvantageous. Control units with electrical components in contrast, although operating in a significantly more accurate manner, disadvantageously always need an energy supply.

Against this background, it is desirable to provide a method for the control of the flow rate or of the pressure of a fluid, which, with regard to apparatus technology, may be implemented in a lightweight constructional manner and which may be applied in a comprehensive and simple manner, as well as with a high accuracy. Moreover, it is desirable to provide a device with which the control of the flow rate and/or the pressure of a fluid is accomplished with the mentioned advantages.

BRIEF SUMMARY OF THE INVENTION

According to an embodiment of the invention, in the method for controlling the pressure and/or the flow rate of a fluid, flow energy is taken from a fluid flowing through a conduit and is at least partly converted into electric energy. At least a part of the electrical energy obtained from the flow energy is used for the control of the flow rate and/or of the pressure of the fluid. Advantageously, a very accurate control may be achieved, since electrical energy is used for the control. A further advantage lies in the possibility of realizing the method in a compact manner with regard to apparatus technology and with a very low weight, since one may make do without an external energy supply and no purely mechanical control of the flow rate and/or of the pressure needs to be effected. Simultaneously, a method which is extremely fail-safe is achieved without an external energy supply, since it may be carried out independently of other supply systems with regard to the energy.

Depending on the demand, the removal of flow energy from a fluid flowing through a conduit may be designed in different manners. Thus the flow energy removal may for example be effected at a fluid conduit, specially the same fluid conduit at which the flow rate and/or the pressure of the fluid is controlled. With this, the method may be carried out in a spatially limited manner at one location of the conduit system. However, it may also be useful to carry out the flow energy removal and the control at different conduits of one or more fluid conduit systems, for example in order to centralize the production of electrical energy for a multitude of systems.

Preferably, the method is designed in a manner such that the flow rate and/or the pressure is controlled with a closed loop and at least a part of the electrical energy which is obtained from the flow energy is used for this closed-loop control. For this, measurement signals with respect to the fluid whose flow rate and/or pressure is to be controlled, is to enter into the closed-loop control via a feedback. Moreover however, also externally obtained measurement information, i.e. measurement information which has been obtained outside the fluid conduit system, for example temperature information or outer pressure information, may be led into such a closed-loop control.

Preferably, in particular gaseous oxygen forms the fluid in the method. Thereby, the method according to a one advantageous application of the invention is applied for the emergency oxygen supply in manned aircraft. Since this method may be applied in a cost-saving, uncomplicated and weight-saving manner, it is particularly useful for application in aircraft. Furthermore, no extreme energy supply is necessary, which is why the method may be applied in an autarkic manner as an emergency system, and in a comprehensive manner. Moreover, the control of the flow rate and/or of the pressure of the fluid may be effected with the necessary accuracy on account of the conversion of a part of the flow energy into electrical energy carried out in the method. Usefully, the method thereby is designed in a manner such that the closed-loop control obtains measurement information with regard to the passenger supply, in particular with regard to the requirement of the oxygen to be led to the oxygen masks, and moreover processes pressure information and/or temperature information, for example for adapting the supply system to the respective flight altitude and temperature.

The device according to an embodiment of the invention for the control of the flow rate and/or of the pressure of a fluid in a conduit, which in particular is suitable for carrying out the described method, includes at least one electrical generator which is designed for the removal of flow energy from a fluid flow and for its at least partial conversion into electrical energy. Further, the device includes a control mechanism for the control of the flow rate and/or of the pressure of the fluid in the conduit. Thereby, the control mechanism is provided with an electric drive which is fed by the generator. By way of the use of an electrical driven control mechanism, one may effect an extremely accurate control of the flow rate and/or of the pressure. Moreover, no additional energy supply needs to be integrated into the device. Thus the device may be operated in an energetically autarkic manner. As a result, a high fail-safety on operation of the device is given. Moreover, the device may be designed in a weight-saving manner, since neither heavy mechanical components nor additional energy sources need to be integrated into the device. In particular, one may make do without a pressure reducer. The electrical generator may thereby be constructed in a single-stage or multi-stage manner.

Depending on the application purpose, the device may be designed in different manners, and in a preferred embodiment the at least one generator and the at least one control mechanism are arranged in a serial manner at the same conduit, in the device. Such a device may be usefully designed such that it may be attached as one part at one location of the conduit. In another preferred embodiment, the at least one generator and the at least one control mechanism are arranged at different conduits, preferably at parallel branches of a conduit system. Accordingly, via such a device, the electrical energy required for the control may be obtained at locations of the conduit system which are suitable for this, and be supplied to the control. Moreover, it is possible to provide a central generator for plurality of control mechanisms in several, also different fluid conduit systems.

Further preferably, the device according to an embodiment of the invention also includes a manual initiation control for subjecting that conduit to fluid flow, which is envisaged for the removal of flow energy by the generator. A device according to one embodiment of the invention may be manually started in this manner, so that that conduit, at which the generator is provided for the removal of flow energy, is subjected to fluid flow. With this, the control mechanism for operational start-up is provided with energy after a manual actuation of the initiation control, so that the further operation of the control is effected automatically. Additionally or alternatively, a manually activatable shut-off valve is provided in the conduits in an advantageous device according to the invention. At the same time, the at least one control mechanism, preferably a valve opened in the idle position, is designed in a manner such that at the beginning of a fluid throughflow in the conduits, it let at least such a high flow rate of the fluid flow through the conduits, that the generator provides an adequately high electric power for the operation of the control means. In this manner too, a sufficiently high fluid flow is made possible by way of an initial manual actuation, so that the generator may automatically drive the control mechanism.

Preferably, the device is provided with a closed-loop control which is supplied by at least a part of the electric energy of the generator. Thus the control of the flow rate and/or of the pressure of the fluid may be provided with a feedback and/or be compared to further external measurement signals, i.e. with information on the surroundings outside the fluid conduit system, such as for example the temperature or the air pressure. In a preferred embodiment of such a closed-loop control, the feedback is effected via a sensor which is designed for the measurement of the flow rate and/or the pressure a fluid, whose output signal is led to the closed-loop control. In this manner, the closed-loop control controls the activation of the control mechanism with a closed loop, with the obtained measurement signals of the sensor.

In a preferred embodiment, the generator of the device is driven by a rotary vane motor. Further preferably, an electrical controlled control valve represents the at least one control mechanism. Particularly preferably, the device is designed for a fluid conduit leading gaseous oxygen and is part of an emergency oxygen supply in unmanned aircraft. It is indeed for this application of the device according to embodiments of the invention, that the possibility of a weight-saving construction, of a more accurate control of the flow rate or of the pressure of a fluid and the energy-autarkic conversion, has been found to be particularly advantageous.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a block diagram of a device according to a preferred embodiment of the invention for the control of the flow rate of a fluid in a conduit.

DETAILED DESCRIPTION OF THE INVENTION

The invention is hereinafter described by way of example and by way of an illustratory picture. FIG. 1 shows the structure of a device according to the invention for the control of the flow rate of a fluid in a conduit. The shown device for the control of flow rate and/or of the pressure of a fluid in a conduit serves for carrying out the method for the control of the flow rate and/or of the pressure of a fluid. In the embodiment example, gaseous oxygen forms the fluid, and the device is designed for operation in an emergency oxygen supply in manned aircraft.

Gaseous oxygen in a compressed gas bottle 5 is carried along on board a manned aircraft and is made available to passengers via oxygen masks 10 in an emergency. The oxygen for this reaches the oxygen masks 10 via fluid conduits 15, 20 designed as oxygen conduits, and conduits 25 designed as flexible supply tubes. Since the pressure in the compressed gas bottle 5 may be up to a few 100 bar, the oxygen pressure is reduced with a reduction valve 30 before feeding the oxygen into the conduit 15. The flow energy of the oxygen flowing through the conduit 15 is partly removed from this by way of an electric generator 35. The electric generator 35, for this, consists of a rotary vane motor 40 which converts the flow energy into rotation energy of a shaft. The rotating shaft subsequently drives an electricity generator 45 which feeds the electrical energy into an electrical supply lead 50. The electrical supply lead 50 feeds an electronic closed-loop control 55. The electronic closed-loop control 55 supplies an activation unit 60 with the obtained electric energy, and this activation unit transfers a part of the electrical energy to the control means 65 designed as an electrically controllable valve. The valve 65 thereby controls the flow rate in the oxygen conduit 20, after the oxygen flowing through the conduits 15 and 20 has passed the electric generator 35. Thus the flow rate of the oxygen reaching the oxygen masks 10 through the supply flexible tubes 25 may thus be controlled via the valve 65.

In order to control the flow rate in the conduit 20 with a closed loop, this is measured via a throughput sensor 70. The measurement signals of the throughput sensor 70 are transmitted to the closed-loop control 55 for feedback. The closed-loop control 55 moreover includes external measurement sensors, i.e. sensors which carry out measurements outside the fluid conduit system. Thus the closed-loop control includes a temperature sensor 75 and an altimeter 80, so that the throughput flow through the oxygen conduits 15, 20 and 25 which is necessary for the emergency supply of the passengers with oxygen, may be determined. The activation unit 60 is integrated into a control unit 85 for this determining of the relevant control variables and this control unit has inputs for the signal leads of the sensors 70, 75 and 80. The measurement signals in the control unit 85 are converted into digital signals by way of an analog-to-digital transducer 90, and the activation unit 60 may further process these signals for the activation of the valve 65.

The generator 35 which in the embodiment example described above is constructed in a two-part manner of a rotary vane motor 40 and of an electricity generator 45, may be replaced by a simple and robust electrical generator 100 which is constructed as one part. Thereby, an oxygen supply conduit 105 and an oxygen discharge conduit 110 run into a torus-shaped oxygen guide 115. A magnet 120 is incorporated in this oxygen guide 115 and is driven by the oxygen which flows through the oxygen guide and continuously moves along a circular path within the torus-shaped guide. A coil 125, which the magnet 120 passes on its revolving path at a high frequency, is wound peripherally about a circular cross section of the torus-shaped oxygen guide 115. An induction voltage may be tapped at the terminals 130 and 135 of the coil 125 by way of this movement of the magnet through the coil. This, as described above, may be used for supplying the closed-loop control 55 via the electric lead 50.

Not represented in the FIGURE is a manual shut-off valve which, when required, sets off the oxygen flow from the compressed gas bottle 5 through the conduits 15, 20 and 25 into the oxygen masks 10. This is realized by a tamper-evident closure which functions as a shut-off valve, is attached on the compressed gas bottle 5 and is set in an opening manner in the emergency case, for the oxygen supply. This tamper-proof closure is actuated centrally and requires no energy supply by the generator, which only starts with the provision of energy at the beginning of the oxygen flow through the conduits 15, 20 and 25.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A device for the control of the flow rate and/or of the pressure of oxygen in a conduit for an emergency oxygen supply in manned aircraft that includes at least one oxygen mask, the device comprising:
    at least one electrical generator (35) configured to remove flow energy from an oxygen flow output from an oxygen supply (5) and to at least partially convert the removed flow energy into electric energy, the at least one electrical generator comprising a torus-shaped oxygen guide (115), a magnet (120) movable in a circular path within the torus-shaped guide by oxygen flowing through the torus-shaped guide, and a coil (125) wound about a circular cross-section of the torus-shaped guide;
    a pressure reduction valve (30) arranged between the oxygen supply (5) and the at least one electrical generator (35);
    at least one control mechanism (65) arranged downstream from the at least one electrical generator (35) for controlling a flow rate of the oxygen to the at least one oxygen mask, the at least one control mechanism (65) comprising an electrical drive fed by the at least one electrical generator (35); and
    at least one sensor (70) configured to measure the flow rate and/or the pressure of the oxygen and provide an output signal, activation of the at least one control mechanism (65) being controlled, at least in part, based on the output signal, the at least one sensor (70) being arranged between the at least one electrical generator (35) and the at least one control mechanism (65).

2. The device according to claim 1, wherein the device further comprises a manual initiation control for the fluid flow of a conduit (15) which is provided for the removal of the flow energy by the generator (35).

3. The device according to claim 1, wherein at least one manually actuatable shut-off valve is provided.

4. The device according to claim 3, wherein the at least one control mechanism (65) is configured such that at the beginning of an oxygen throughflow from the oxygen supply (5) to the at least one oxygen mask (10), the at least one control mechanism (65) allows at least such a high flow rate of the oxygen that the at least one electrical generator (35) provides an adequately high electrical power for the operation of the at least one control mechanism (65).

5. The device according to claim 4, wherein the at least one control mechanism (65) is a valve open in an idle position.

6. The device according to claim 1, wherein a closed-loop control (55) is provided for the at least one control mechanism (65) and receives at least a part of the electrical energy from the at least one electrical generator (35).

7. The device according to claim 6, wherein the output signal from the at least one sensor (70) is provided to the closed-loop control (55).

8. The device according to claim 7, wherein the closed-loop control (55) further receives output signals from at least one of a temperature sensor (75) and an altimeter (80) for controlling activation of the at least one control mechanism (65).

9. The device according to claim 1, wherein the at least one control mechanism (65) is formed by an electrically controlled control valve.

* * * * *